(12) United States Patent
Chen et al.

(10) Patent No.: US 11,415,184 B2
(45) Date of Patent: Aug. 16, 2022

(54) AXLE AND VEHICLE

(71) Applicant: SEGWAY TECHNOLOGY CO., LTD., Changzhou (CN)

(72) Inventors: Shangjian Chen, Changzhou (CN); Zhengchang Deng, Changzhou (CN)

(73) Assignee: SEGWAY TECHNOLOGY CO. LTD., Changzhou (CN)

( * ) Notice: Subject to any disclaimer, the term of this patent is extended or adjusted under 35 U.S.C. 154(b) by 0 days.

(21) Appl. No.: 17/474,110

(22) Filed: Sep. 14, 2021

(65) Prior Publication Data

US 2022/0082140 A1 Mar. 17, 2022

(30) Foreign Application Priority Data

Sep. 17, 2020 (CN) .......................... 202022053046.3

(51) Int. Cl.
| | |
|---|---|
| *F16D 27/108* | (2006.01) |
| *B60K 17/02* | (2006.01) |
| *B60K 17/22* | (2006.01) |
| *B60K 23/08* | (2006.01) |
| *F16D 41/067* | (2006.01) |

(52) U.S. Cl.
CPC ............ *F16D 27/108* (2013.01); *B60K 17/02* (2013.01); *B60K 17/22* (2013.01); *B60K 23/08* (2013.01); *F16D 41/067* (2013.01)

(58) Field of Classification Search
CPC ..... F16D 27/108; F16D 27/112; F16D 41/067
See application file for complete search history.

(56) References Cited

U.S. PATENT DOCUMENTS

| | | | |
|---|---|---|---|
| 6,244,403 | B1 | 6/2001 | Ito et al. |
| 6,595,337 | B2 | 7/2003 | Goto et al. |
| 6,766,888 | B2 | 7/2004 | Yasui et al. |
| | | (Continued) | |

FOREIGN PATENT DOCUMENTS

| | | |
|---|---|---|
| CN | 210920012 U | 7/2020 |
| EP | 1577193 A1 | 9/2005 |
| JP | 2009153283 A * | 7/2009 |

OTHER PUBLICATIONS

Extended European Search Report dated Feb. 16, 2022 for Application No. 21197184.1, 5 pages.

*Primary Examiner* — Stacey A Fluhart
(74) *Attorney, Agent, or Firm* — Frost Brown Todd LLC (57) ABSTRACT

An axle includes: an electromagnet; a transmission disc provided with a first magnetic suction member; a half shaft fitted in the transmission disc, first and second gaps being arranged circumferentially between the transmission disc and the half shaft; and a transmission assembly arranged between the transmission disc and the half shaft, and provided with a second magnetic suction member, a thickness of the transmission assembly being less than the first gap, and greater than or equal to the second gap. When the electromagnet is powered off, the transmission assembly and the half shaft are relatively stationary, and the transmission assembly is located at the first gap. When the electromagnet is powered on, the first magnetic suction member and the second magnetic suction member are attracted by the electromagnet, and the transmission disc rotates synchronously with the transmission assembly and rotates to the second gap relative to the half shaft.

18 Claims, 6 Drawing Sheets

(56) References Cited

U.S. PATENT DOCUMENTS

| | | |
|---|---|---|
| 7,350,632 B2 | 4/2008 | Houtman et al. |
| 8,857,294 B2 | 10/2014 | Brewer et al. |
| 9,360,059 B2 | 6/2016 | Palmer et al. |
| 2003/0051961 A1* | 3/2003 | Yasui .................... F16D 41/088 |
| | | 192/84.8 |

* cited by examiner

AXLE AND VEHICLE

CROSS-REFERENCE TO RELATED APPLICATION

This application claims the benefit of priority to Chinese patent Application No. 202022053046.3, filed on Sep. 17, 2020, the content of which is incorporated herein by reference in its entirety.

FIELD

The present disclosure relates to a field of mechanical structure designs, and more particularly, to an axle and a vehicle.

BACKGROUND

An axle clutch is located between an engine and a transmission, and is arranged in a housing of an axle. It is used to temporarily separate the engine from the transmission or gradually engage the engine with the transmission, to cut off or transmit a power input from the engine to the transmission.

A vehicle in the related art can switch between a 2WD mode and a 4WD mode, and this switching needs to be realized through an electromagnetic clutch. In the related art, a form of a single plate is generally adopted. In this way, the clutch cannot operate when wheels of the vehicle are not rotating, for example, when the vehicle is in a starting state, or, when the wheels of the vehicle are stuck or fall into a pit and driven wheels cannot rotate. The vehicle cannot switch into the 4WD mode under these states. In particular, when the vehicle is stuck, it cannot switch into the 4WD mode, which will result in an insufficient ability of the vehicle to get out of trouble.

SUMMARY

A first aspect of embodiments of the present disclosure provides an axle for a vehicle, including: a housing; an electromagnet fixed in the housing; a transmission disc rotatably arranged in the housing and connected to a transmission system of the vehicle, in which the transmission disc is provided with a first magnetic suction member, and the first magnetic suction member is circumferentially fixed and axially movable relative to the transmission disc; a half shaft connected to wheels of the vehicle, in which the transmission disc is sleeved on the half shaft, a first gap and a second gap are arranged circumferentially between the transmission disc and the half shaft, and the first gap is greater than the second gap; and a transmission assembly arranged between the transmission disc and the half shaft, in which the transmission assembly is provided with a second magnetic suction member, and the second magnetic suction member is circumferentially fixed and axially movable relative to the transmission assembly; a thickness of the transmission assembly is less than the first gap, and greater than or equal to the second gap. When the electromagnet is powered off, the transmission assembly and the half shaft are relatively stationary, and the transmission assembly is located at the first gap; when the electromagnet is powered on, the first magnetic suction member and the second magnetic suction member are attracted by the electromagnet to allow the transmission disc to rotate synchronously with the transmission assembly, and the transmission assembly rotates to the second gap relative to the half shaft and engages the half shaft with the transmission disc.

A second aspect of the embodiments of the present disclosure provides a vehicle, including an axle. The axle includes: a housing; an electromagnet fixed in the housing; a transmission disc rotatably arranged in the housing and connected to a transmission system of the vehicle, in which the transmission disc is provided with a first magnetic suction member, and the first magnetic suction member is circumferentially fixed and axially movable relative to the transmission disc; a half shaft connected to wheels of the vehicle, in which the transmission disc is sleeved on the half shaft, a first gap and a second gap are arranged circumferentially between the transmission disc and the half shaft, and the first gap is greater than the second gap; and a transmission assembly arranged between the transmission disc and the half shaft, in which the transmission assembly is provided with a second magnetic suction member, and the second magnetic suction member is circumferentially fixed and axially movable relative to the transmission assembly; a thickness of the transmission assembly is less than the first gap, and greater than or equal to the second gap. When the electromagnet is powered off, the transmission assembly and the half shaft are relatively stationary, and the transmission assembly is located at the first gap; when the electromagnet is powered on, the first magnetic suction member and the second magnetic suction member are attracted by the electromagnet to allow the transmission disc to rotate synchronously with the transmission assembly, and the transmission assembly rotates to the second gap relative to the half shaft and engages the half shaft with the transmission disc.

BRIEF DESCRIPTION OF THE DRAWINGS

To describe technical solutions in embodiments of the present disclosure more clearly, the following will briefly introduce the accompanying drawings required for the description of the embodiments. Obviously, the accompanying drawings described below only show some embodiments of the present disclosure, and those skilled in the art can obtain other drawings based on these drawings without paying creative efforts.

DETAILED DESCRIPTION

Technical solutions in embodiments of the present disclosure will be clearly and completely described below with reference to the accompanying drawings in the embodiments of the present disclosure. Obviously, the embodiments described herein are only a part but not all of the embodiments of the present application. Based on the embodiments of the present disclosure, all other embodiments obtained by those skilled in the art without paying creative efforts, fall into the protection scope of the present application.

The "include/comprise" mentioned in the entire specification and claims is an open term, so it should be interpreted as "include/comprise but not limited to". "Substantially" means that within the acceptable error range, those skilled in the art can solve the technical problem within a certain error range, and the technical effects can be basically achieved.

In addition, the term "connect" here includes any direct and indirect connection means. Therefore, if the text describes that a first device is connected to a second device, it means that the first device can be directly connected to the second device, or indirectly connected to the second device through other devices. The following descriptions of the specification are preferred embodiments for implementing the present disclosure, but the descriptions are for the purpose of explaining the general principles of the present disclosure, and are not intended to limit the scope of the present disclosure. The protection scope of the present disclosure shall be subject to those defined by the appended claims.

It should be understood that the term "and/or" used herein is only an association relationship that describes associated objects, which means that there can be three relationships. For example, A and/or B can mean three cases: A alone exists; both A and B exist at the same time; C alone exists. In addition, the character "/" herein generally means that the associated former and latter objects have an "or" relationship.

Through creative efforts, the inventor found that a vehicle in the related art generally switches between a two-wheel drive (2WD) mode and a four-wheel drive (4WD) mode by arranging a clutch. For example, only rear wheels are driven when the vehicle is in the 2WD mode, while in the process of switching into the 4WD mode, a transmission disc of the clutch needs to be engaged with a half shaft corresponding to front wheels. Thus, the power of an engine can be transmitted to the front wheels through the transmission disc, so that the front wheels are also in a driven state.

The clutch in the related art includes an electromagnet, a single plate, a transmission disc, a half shaft and a transmission assembly. The transmission disc is sleeved outside the half shaft, and the transmission assembly is located between the transmission disc and the half shaft. The single plate is circumferentially fixed relative to the transmission assembly, and can move axially on the transmission assembly. When the electromagnet is powered on, the single plate is attracted with the electromagnet. Since the electromagnet is stationary, a rotation of the single plate is also limited, and a rotation of the transmission assembly circumferentially fixed with the single plate is also limited. If the front wheels are stationary, the half shaft will not rotate. Therefore, there will be no speed difference between the transmission assembly and the half shaft, and the transmission assembly will not move to an engaged position relative to the half shaft. In this state, the transmission disc cannot be engaged with the half shaft, and the power cannot be transmitted to the front wheels through the clutch. Therefore, the vehicle cannot switch into the 4WD state when the wheels are not rotating. In particular, when the wheels are stuck and need to get out of trouble, since the wheels cannot rotate, the vehicle cannot switch into the 4WD state, thus resulting in an insufficient ability of the vehicle to get out of trouble.

In order to solve the above specific technical problems, the present disclosure provides following embodiments, so that the vehicle can allow the transmission disc to be engaged with the half shaft when the wheels are both in a rotary or static state, and the power of a power system can be transmitted. Thus, all four wheels become driving wheels, and the manipulation flexibility is high.

Figure 1:
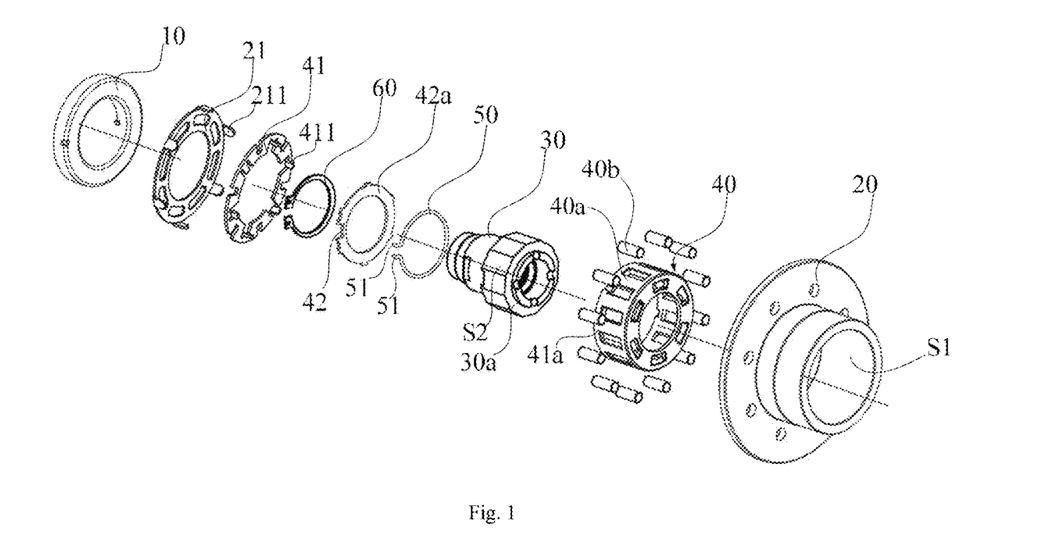
FIG. 1 is a schematic exploded view of an axle clutch according to embodiments of the present disclosure.
Figure 2:
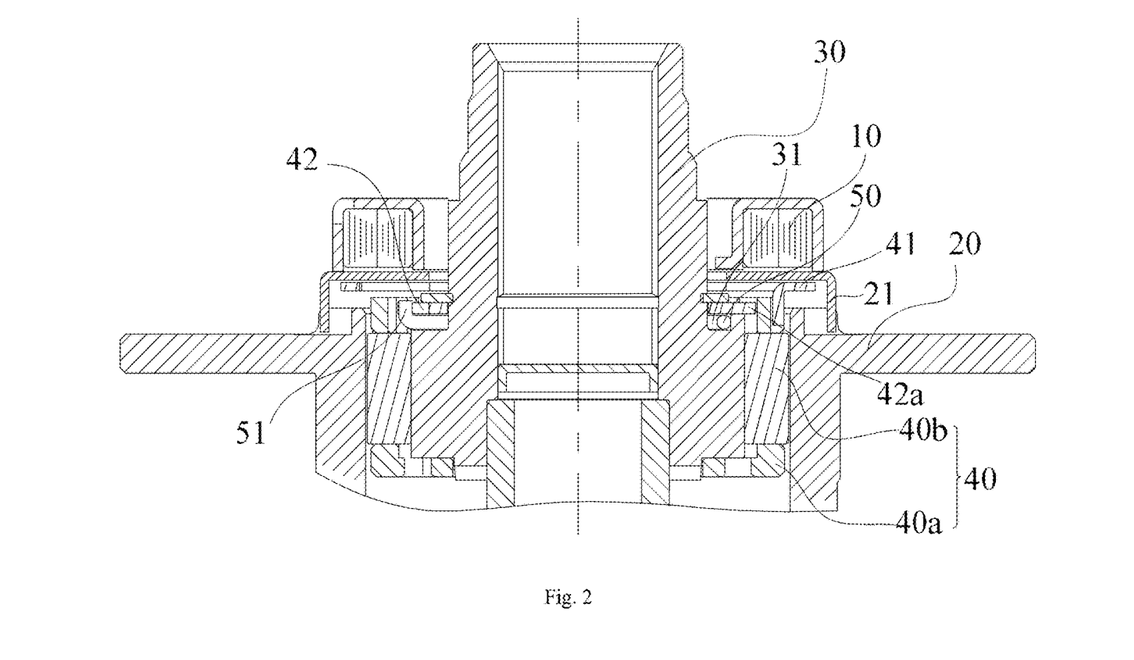
FIG. 2 is a sectional view of an axle clutch according to embodiments of the present disclosure.

FIG. 1 is a schematic exploded view of an axle clutch according to embodiments of the present disclosure, and FIG. 2 is a sectional view of an axle clutch according to embodiments of the present disclosure. Reference is made to FIG. 1 and FIG. 2. The clutch provided by an embodiment of the present disclosure is applied to a vehicle, which can include at least one of a hybrid electric vehicle, an automobile, a go-kart, a drift vehicle, an all-terrain vehicle, etc. The vehicle of this embodiment can have the 2WD mode and the 4WD mode, and can switch between the 2WD mode and the 4WD mode. The 2WD mode refers to that two front wheels participate in the drive or two rear wheels participate in the drive, and the 4WD mode refers to that the two front wheels and the two rear wheels both participate in the drive. Switching from the 2WD mode to the 4WD mode is realized by whether the transmission disc is engaged with the half shaft through the clutch. The transmission disc is engaged with the half shaft when the clutch operates, so that the power can be transmitted to wheels corresponding to the half shaft.

Figure 9:
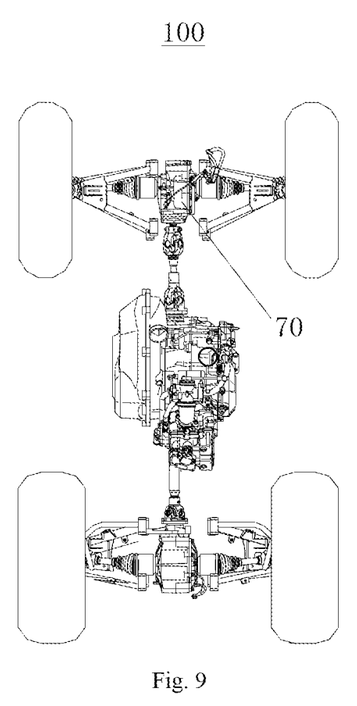
FIG. 9 is a schematic view of a vehicle according to embodiments of the present disclosure.

As shown in FIG. 1 and FIG. 9, an axle for a vehicle 100 provided by this embodiment includes an electromagnet 10, a transmission disc 20, a half shaft 30 and a transmission assembly 40.

The electromagnet 10 is fixed to the vehicle 100. Specifically, the electromagnet 10 can be detachably or nondetachably fixed to a housing 70 of the vehicle's axle. In some embodiments, the electromagnet 10 can also be fixed to other fixed components of the vehicle 100, which is not particularly limited by the present disclosure, as long as the electromagnet 10 can be fixed at a preset position. The electromagnet 10 can be electrically connected to a control circuit (not shown in drawings), which can control whether the electromagnet 10 is powered on, so as to control whether the electromagnet 10 generates a magnetic field.

The transmission disc 20 is connected to a transmission system of the vehicle 100. The transmission disc 20 is provided with a first magnetic suction member 21, and the first magnetic suction member 21 is circumferentially fixed and is axially movable relative to the transmission disc 20. The transmission system of the vehicle 100 can be connected to an engine and a gearshift system of the vehicle 100. The power of the engine is transmitted to the gearshift system, and the power of the gearshift system is transmitted to the half shaft 30 through the transmission disc 20. The half shaft 30 is connected to wheels. The wheels can receive the power of the transmission system and become driving wheels when the transmission disc 20 is engaged with the half shaft 30, i.e. the transmission to the half shaft 30 through the transmission disc 20 is possible.

Figure 8:
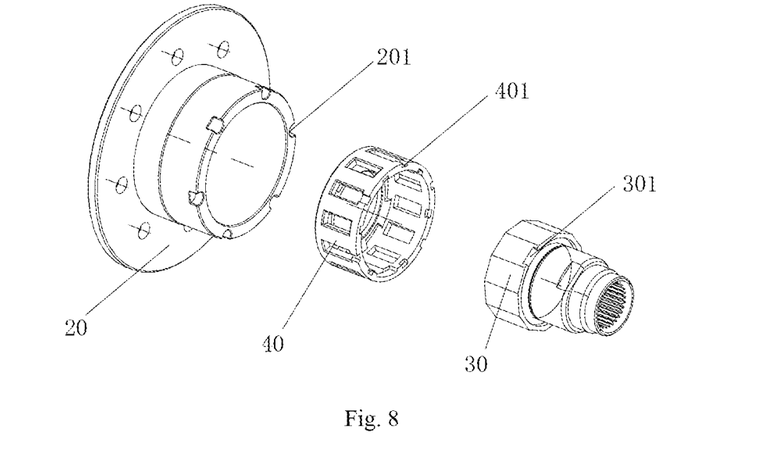
FIG. 8 is a schematic view of a transmission disc, a half shaft and a transmission assembly according to embodiments of the present disclosure.

As shown in FIG. 1 and FIG. 8, in order to realize the circumferential fixation of the first magnetic suction member 21 relative to the transmission disc 20, one of the first magnetic suction member 21 and the transmission disc 20 may have a first engagement member 211 extending in a direction parallel to a axial direction, and the other one of the first magnetic suction member 21 and the transmission disc 20 has a first fitting portion 201 fitted with the first engagement member 211. The first engagement member 211 is engaged into the first fitting portion 201 to fix circumferentially the first magnetic suction member 21 with the transmission disc 20. More specifically, the first magnetic suction member 21 may be made of metal that can be magnetically attracted, or may be a magnetic member. The first magnetic suction member 21 may be a ring sheet structure, and the first engagement member 211 may have a sheet form. A plurality of first engagement members 211 may be evenly arranged along a circumferential direction of the first magnetic suction member 21. In some embodiments of the present disclosure, the plurality of first engagement members 211 may be arranged at an outer edge of the first magnetic suction member 21. In some other embodiments, the first engagement member 211 may be located on a surface of the first magnetic suction member 21. The transmission disc 20 may have the first fitting portion 201 configured to be fitted with the first engagement member 211. The first fitting portion 201 may be a groove or a hole, as long as the first engagement member 211 can be engaged therein, and the plurality of first engagement members 211 are engaged into corresponding first fitting portions 201 respectively, to prevent a relative rotation of the first magnetic suction member 21 and the transmission disc 20 through fitting of the first engagement member 211 and the first fitting portion 201, that is, the first magnetic suction member 21 is circumferentially fixed with the transmission disc 20. Meanwhile, the first engagement member 211 of the first magnetic suction member 21 can move axially in the first fitting portion 201, so that the transmission disc 20 may not move while the first magnetic suction member 21 moves axially.

Figure 3:
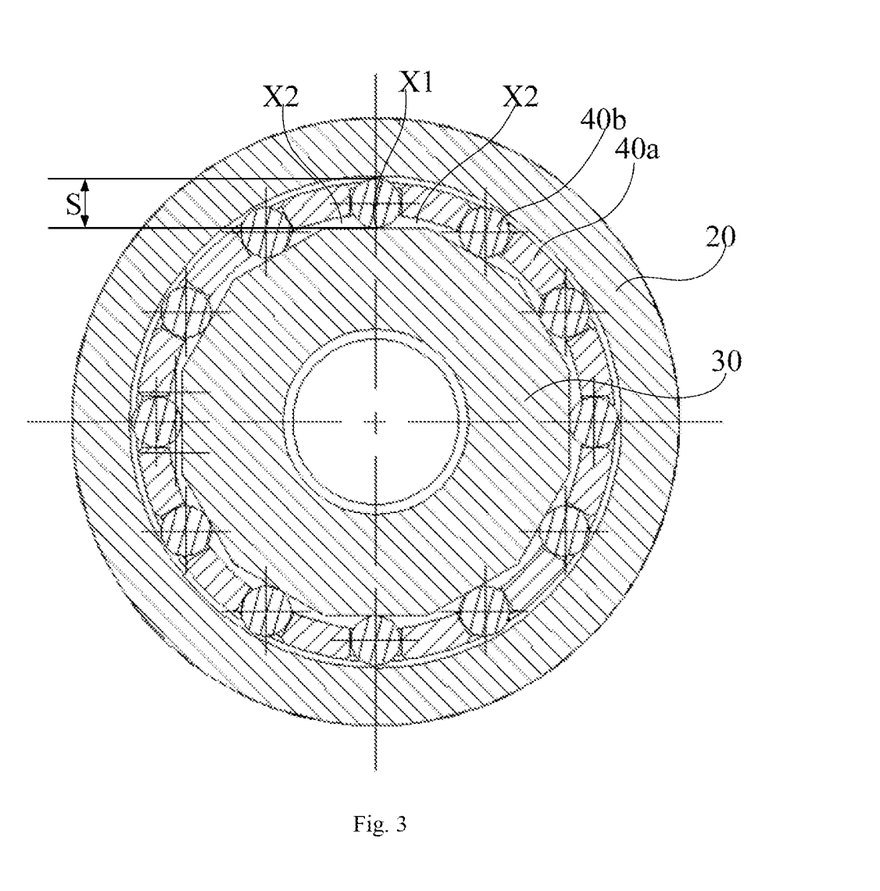
FIG. 3 is a schematic view showing a state of a half shaft, a transmission assembly and a transmission disc when an axle clutch according to embodiments of the present disclosure is not engaged.

FIG. 3 is a schematic view showing a state of the half shaft, the transmission assembly and the transmission disc when the clutch provided by the embodiment of the present disclosure is not engaged. As shown in FIGS. 1 to 3, the half shaft 30 is connected to the wheels, and the transmission disc 20 is fitted over the half shaft 30. Specifically, the transmission disc 20 is sleeved outside of the half shaft 30. There are a first gap X1 and a second gap X2 arranged circumferentially between the transmission disc 20 and the half shaft 30, and the first gap X1 is greater than the second gap X2. Specifically, the transmission disc 20 can be coaxially sleeved over the half shaft 30. The power of the transmission disc 20 can be transmitted to the half shaft 30 when the half shaft 30 is engaged with the transmission disc 20, so that the half shaft 30 and the transmission disc 20 rotate synchronously. It should be noted that, when the vehicle 100 is started-up, the transmission disc 20 is always rotating, and the half shaft 30 can rotate or not. No matter whether the half shaft 30 rotates or not, there are always the first gap X1 and the second gap X2 between the transmission disc 20 and the half shaft 30.

The transmission assembly 40 is arranged between the transmission disc 20 and the half shaft 30, the transmission assembly 40 is provided with a second magnetic suction member 41, and the second magnetic suction member 41 is circumferentially fixed and is axially movable relative to the transmission assembly 40. A thickness S of the transmission assembly 40 is less than the first gap X1 and greater than or equal to the second gap X2, so that the transmission assembly 40 can rotate between the first gap X1 and the second gap X2, and can be clamped at the second gap X2.

In order to realize the circumferential fixation of the second magnetic suction member 41 relative to the transmission assembly 40, one of the second magnetic suction member 41 and the transmission assembly 40 may have a second engagement member 411 extending in the direction parallel to the axial direction, the other one of the second magnetic suction member 41 and the transmission assembly 40 may have a second fitting portion 401 fitted with the second engagement member 411, as shown in FIG. 1 and FIG. 8. The second engagement member 411 is engaged into the second fitting portion 401 to fix circumferentially the second magnetic suction member 41 with the transmission assembly 40. More specifically, the second magnetic suction member 41 may be a ring sheet structure, and the second engagement member 411 may have a sheet form. There may be a plurality of second engagement members 411, and the plurality of second engagement members 411 may be evenly arranged along a circumferential direction of the second magnetic suction member 41 of the ring sheet shape. The transmission assembly 40 may have the second fitting portion 401 configured to be fitted with the second engagement member 411. The second fitting portion 401 may be a groove or a hole, as long as the second engagement member 411 can be engaged therein, and the plurality of second engagement members 411 are engaged into corresponding second fitting portions 401 respectively, so as to prevent a relative rotation of the second magnetic suction member 41 and the transmission assembly 40 through fitting of the second engagement member 411 and the second fitting portion 401, that is, the second magnetic suction member 41 is circumferentially fixed with the transmission assembly 40. Meanwhile, the second engagement member 411 of the second magnetic suction member 41 can move axially in the second fitting portion 401, so that the transmission assembly 40 may not move while the second magnetic suction member 41 moves axially.

When the electromagnet 10 is powered off, the transmission assembly 40 and the half shaft 30 are relatively stationary, and the transmission assembly 40 is located at the first gap X1. When the electromagnet 10 is powered on, the first magnetic suction member 21 and the second magnetic suction member 41 will also be attracted together through the magnetic suction force when the first magnetic suction member 21 and the second magnetic suction member 41 are attracted by the electromagnet 10, thus allowing the transmission assembly 40 to rotate synchronously with the transmission disc 20. The transmission assembly 40 rotates to the second gap X2 relative to the half shaft 30, so as to be clamped between the transmission disc 20 and the half shaft 30.

Specifically, the electromagnet 10 can be turned on through the control circuit, so that the electromagnet 10 is powered on to generate the magnetic field. Since the first magnetic suction member 21 can move axially relative to the transmission disc 20, the electromagnet 10 can attract the first magnetic suction member 21. Since the second magnetic suction member 41 can move axially relative to the transmission assembly 40, the electromagnet 10 can attract the second magnetic suction member 41. Therefore, when the electromagnet 10 is powered on, the first magnetic suction member 21 and the second magnetic suction member 41 are attracted by the electromagnet 10, while the first magnetic suction member 21 is circumferentially fixed with the transmission disc 20, and the second magnetic suction member 41 is circumferentially fixed with the transmission assembly 40. Therefore, the transmission disc 20, the first magnetic suction member 21, the second magnetic suction member 41 and the transmission assembly 40 rotate synchronously when the electromagnet 10 is powered on.

When the clutch is in a non-operating state, that is, when the electromagnet 10 is not powered on, the half shaft 30 is not engaged, and the transmission disc 20 idles outside the half shaft 30 and the transmission assembly 40, while the half shaft 30 and the transmission assembly 40 are dragged by the wheels to rotate, or the wheels do not rotate, and the half shaft 30 and the transmission assembly 40 do not rotate. There is no speed difference between the half shaft 30 and the transmission assembly 40, that is, the half shaft 30 and the transmission assembly 40 are relatively stationary, no matter whether the wheels rotate or not. Further, the transmission assembly 40 is located at the first gap X1. Since the first gap X1 is greater than the thickness of the transmission assembly 40, the transmission assembly 40 will not affect the rotation of the transmission disc 20 in this state, the transmission disc 20 is in an idle state, the power of the transmission system cannot be transmitted to the half shaft 30, and the vehicle 100 can be maintained in the 2WD mode.

At the moment when the electromagnet 10 is powered on, i.e. when the first magnetic suction member 21 and the second magnetic suction member 41 are suddenly attracted, and a speed of the second magnetic suction member 41 and the transmission assembly 40 is suddenly close to a speed of the first magnetic suction member 21 and the transmission disc 20. At this time, an instantaneous speed difference is generated between the transmission assembly 40 and the half shaft 30, thus resulting in a relative rotational displacement therebetween. Therefore, the transmission assembly 40 rotates to the second gap X2 relative to the half shaft 30. Since the second gap X2 is less than the thickness of the transmission assembly 40, the transmission assembly 40 is clamped at the second gap X2, so that the transmission assembly 40 applies an engagement force to the transmission disc 20 and the half shaft 30 to allow the transmission assembly 40, the transmission disc 20 and the half shaft 30 to rotate together. Therefore, after the electromagnet 10 is powered on and the transmission assembly 40, the transmission disc 20 and the half shaft 30 are engaged, the three rotate together, the power of the transmission system is transmitted to the half shaft 30, and the vehicle 100 is switched to the 4WD mode at this time.

The clutch provided by the embodiment of the present disclosure includes the electromagnet, the transmission disc connected to the transmission system, the half shaft arranged inside the transmission disc, and the transmission assembly sleeved between the transmission disc and the half shaft. The transmission disc is provided with the first magnetic suction member circumferentially fixed and axially movable. The first gap and the second gap are arranged circumferentially between the transmission disc and the half shaft, and the first gap is greater than the second gap. The transmission assembly is provided with the second magnetic suction member circumferentially fixed and axially movable. When the electromagnet is powered off, the transmission assembly and the half shaft are relatively stationary, while the transmission disc is always rotating, and the transmission disc is in the idle state relative to the transmission assembly and the half shaft. When the electromagnet is powered on, the first magnetic suction member and the second magnetic suction member are attracted by the electromagnet, so that the transmission disc and the transmission assembly rotate substantially synchronously. At this moment, the speed difference is generated between the transmission assembly and the half shaft, so that the transmission assembly rotates to the second gap relative to the half shaft. The thickness of the transmission assembly is less than the first gap and greater than or equal to the second gap, and therefore the transmission assembly is clamped at the second gap at this time. Then, the transmission disc, the transmission assembly and the half shaft rotate together. In this case, the vehicle changes into the 4WD state. In this technical solution, since the speed difference between the half shaft and the transmission assembly is determined by the transmission disc and the half shaft, even if the half shaft does not rotate, when the electromagnet is powered on, the transmission disc can also be engaged with and rotate together with the half shaft through the transmission assembly, as long as the transmission disc rotates. Therefore, the vehicle can also switch from the 2WD mode to the 4WD mode even if the vehicle is in a state in which the wheels do not rotate (a stationary state), thus resulting in a good flexibility.

As shown in FIG. 3, there are at least two second gaps X2. In a circumferential direction, the at least two second gaps X2 are located on both sides of the first gap X1. Moreover, the first gap X1 is communicated with the second gap X2, so that the transmission assembly 40 can rotate from the first gap X1 to the second gap X2 or from the second gap X2 to the first gap X1. By arranging the at least two second gaps X2 on both sides of the first gap X1, the transmission disc 20 can realize the engagement of the clutch in the case of both a forward rotation or a reverse rotation.

Figure 4:
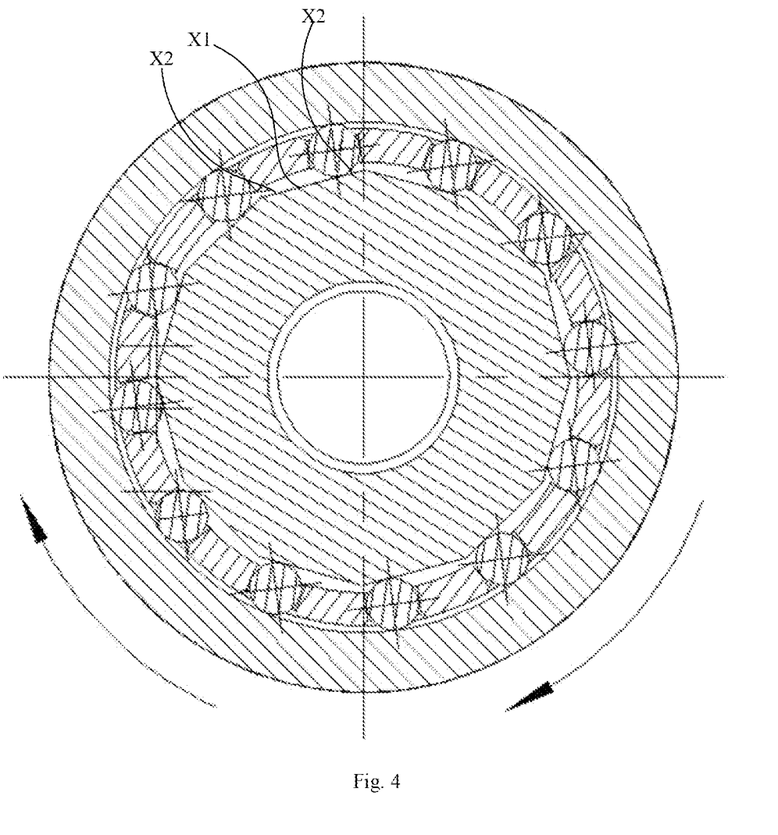
FIG. 4 is a schematic view showing a state of a half shaft, a transmission assembly and a transmission disc when an axle clutch according to embodiments of the present disclosure is engaged in a forward rotation.
Figure 5:
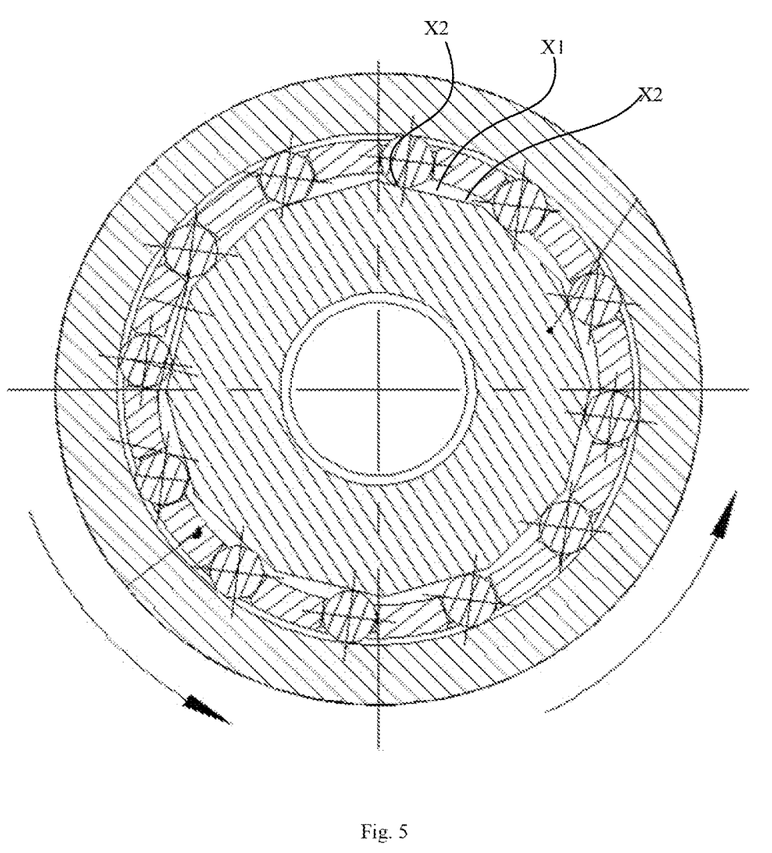
FIG. 5 is a schematic view showing a state of a half shaft, a transmission assembly and a transmission disc when an axle clutch according to embodiments of the present disclosure is engaged in a reverse rotation.

For example, FIG. 4 is a schematic view showing a state of the half shaft, the transmission assembly and the transmission disc when the clutch provided by the embodiment of the present disclosure is engaged in the forward rotation. As shown in FIG. 4, when the transmission disc 20 and the wheels rotate forward (clockwise), the transmission assembly 40 rotates forward to be clamped into the second gap X2. FIG. 5 is a schematic view showing a state of the half shaft, the transmission assembly and the transmission disc when the clutch provided by the embodiment of the present disclosure is engaged in the reverse rotation. As shown in FIG. 5, when the transmission disc 20 and the wheels rotate reversely (counterclockwise), the transmission assembly 40 rotates reversely to be clamped into the second gap X2.

It can be seen from the above that the clutch provided by this embodiment can operate normally during both the forward rotation and the reverse rotation. Further, the two second gaps X2 can be symmetrically arranged on both sides of the first gap X1, and therefore engagement forces generated by the clutch can be equal when the wheels rotate forward or reverse.

In some embodiments, the transmission disc 20 has a hollow interior and an inner peripheral surface of the transmission disc 20 is a first contact surface S1. The half shaft 30 includes a connector 30a, which is arranged inside the transmission disc 20, and an outer peripheral surface of the connector 30a is a second contact surface S2. One of the first contact surface S1 and the second contact surface S2 is an annular surface, and the other one of the first contact surface S1 and the second contact surface S2 is a regular polygon surface formed by a plurality of sections connected sequentially. The first gap X1 is formed between a middle portion of each section of the regular polygon surface and the annular surface, and the second gap X2 is formed between a portion on either side of the middle portion of each section of the regular polygon surface and the annular surface.

In a specific embodiment, as shown in FIG. 1 and FIGS. 3-5, the second contact surface S2 of an end (the connector 30a) of the half shaft 30 fitted in the transmission disc 20 is the regular polygon surface, and the inner peripheral surface of the transmission disc 20 for the half shaft 30 to pass through is the annular surface. The first gap X1 is formed between the middle portion of each section of the regular polygon surface and the first contact surface S1 of the transmission disc 20, and the second gap X2 is formed between an either side portion of each section of the regular polygon surface and the first contact surface S1 of the transmission disc 20. Specifically, since the first contact surface S1 of the transmission disc 20 is the annular surface, and the outer surface of the connector 30*a* of the half shaft 30 is the second contact surface S2, which is the regular polygon surface, the gaps between the transmission disc 20 and the half shaft 30 remain the same in size no matter how the transmission disc 20 and the half shaft 30 rotate relative to each other. For a division of the first gap X1 and the second gap X2, it can be specified that, a position range where the gap between the transmission disc 20 and the half shaft 30 is greater than or equal to the thickness of the transmission assembly 40 is the first gap X1, and a position range where the gap between the transmission disc 20 and the half shaft 30 is less than the thickness of the transmission assembly 40 is the second gap X2.

It should be noted that in this embodiment, the first gap X1 does not have a fixed gap value, but has a gap range. For example, a gap between 5 cm and 10 cm belongs to the first gap X1. The second gap X2 does not have a fixed gap value either, but has a gap range. For example, a gap between 1 cm and 4.9999 cm belongs the second gap X2.

In this embodiment, an outer contour of a cross section of an outer side wall of the connector 30*a* of the half shaft 30 is designed to have a regular polygon shape. As shown in FIGS. 3 to 5, the cross section of the outer side wall of the half shaft 30 in this embodiment is designed to have a regular dodecagon shape. In some other embodiments, the half shaft 30 can also have a regular octagon shape, a regular hexadecagon shape, a regular octadecagon shape, etc. Further, a cross section of an inner shaft hole of the transmission disc 20 is designed to have a circle shape. Thus, the first gap X1 and the second gap X2 are formed between an arc surface and a flat surface, so that a change of the gaps has a smooth transition, and the switching is smooth and the transition is stable during the transition of the clutch from an unengaged state to an engaged state. Moreover, the more the transmission assembly 40 moves to both sides of the edge of the regular polygon of the half shaft 30, the stronger the clamping force is. During an engagement process of the transmission assembly 40, the clamping force gradually increases, and the transmission assembly 40 is finally clamped at the side portion of the edge of the regular polygon of the half shaft 30 with a maximum clamping force (as shown in FIG. 4 or FIG. 5). After the engagement, the transmission assembly 40, the half shaft 30 and the transmission disc 20 continue to rotate together to transmit the power. After the engagement, it is not easy to loosen them and a good reliability is provided.

Of course, it can be understood that when the inner peripheral surface of the transmission disc 20 is designed as the regular polygon surface and the outer side wall (the second contact surface S2) of the connector 30*a* of the half shaft 30 is designed as the annular surface, the transmission assembly 40, the half shaft 30 and the transmission disc 20 can also be switched between the engaged state and the unengaged state, which is not limited in this embodiment.

Specifically, as shown in FIG. 1 and FIGS. 3 to 5, the transmission assembly 40 can include a base member 40*a* and a protrusion member 40*b*. The base member 40*a* is sleeved between the transmission disc 20 and the half shaft 30, and the protrusion member 40*b* protrudes along a thickness direction of the base member 40*a*. When the transmission assembly 40 is at the second gap X2, the protrusion member 40*b* is clamped between the half shaft 30 and the transmission disc 20. A surface of the protrusion member 40*b* in contact with the half shaft 30 and the transmission disc 20 may be an arc surface or a spherical surface, so that a friction resistance is small during a rotation of the transmission assembly 40 relative to the half shaft 30, and thus the operation smoothness of the clutch is improved.

A plurality of protrusion members 40*b* are provided, and each protrusion member 40*b* is correspondingly fitted with each section of the regular polygon surface respectively. That is, at most one protrusion member 40*b* can be provided between each section of the regular polygon surface and the annular surface. When the clutch is in an operating state and the non-operating state, the protrusion member 40*b* rotates in a small range between each section of the regular polygon surface and the annular surface, that is, the transmission assembly 40 can only rotate in a small range relative to the half shaft 30 so as to achieve the engagement and loosening in a small range. Thus, the response efficiency of the clutch is improved and the handling sensitivity of the whole vehicle is improved.

In some embodiments of the present disclosure, the protrusion member 40*b* can be rotatably connected to the base member 40*a*, and a rolling direction of the protrusion member 40*b* is consistent with a rotation direction of the base member 40*a*. Since the protrusion member 40*b* is rotatably connected to the base member 40*a*, the protrusion member 40*b* is in rolling contact with the half shaft 30 and the transmission disc 20 during the rotation of the transmission assembly 40 relative to the half shaft 30. Therefore, the friction resistance during the rotation of the transmission assembly 40 can be further reduced and the operation smoothness of the clutch can be improved.

Specifically, the protrusion member 40*b* may include a ball and/or a roller. In this embodiment, the protrusion member 40*b* is the roller, and a rotation axis of the roller can be parallel to an axis of the base member 40*a*. In this structure form, the contact between the protrusion member 40*b* and the half shaft 30 is a linear contact. In some other embodiments, the protrusion member 40*b* can be the ball, a groove for receiving the ball can be formed in the base member 40*a*, and the ball can rotate freely in the groove. In this structure form, the contact between the protrusion member 40*b* and the half shaft 30 is a point contact. It can be understood that when the protrusion member 40*b* is the ball, a friction force between the protrusion member 40*b* and the half shaft 30, the transmission disc 20 is the smallest. When the protrusion member 40*b* is the roller, the friction force between the protrusion member 40*b* and the half shaft 30, the transmission disc 20 is slightly larger than the friction force in the case that the protrusion member 40*b* is the ball, but the generated clamping force is greater when the protrusion member 40*b* is clamped by the half shaft 30 and the transmission disc 20. Therefore, comprehensively considering the friction resistance during the rotation of the transmission assembly 40 relative to the half shaft 30 and the clamping force after the transmission assembly 40 is clamped by the half shaft 30 and the transmission disc 20, the protrusion member 40*b* of the transmission assembly 40 is the roller.

Further, as shown in FIG. 1 and FIGS. 3 to 5, a plurality of protrusion members 40*b* are provided, and the plurality of protrusion members 40*b* are evenly arranged at intervals along a circumferential direction of the base member 40a. Thus, forces can be evenly applied to a circumference of the half shaft 30, so as to effectively avoid the excessive local stress and the deformation such as bending of the half shaft 30, thus improving the service life of the clutch and the whole vehicle.

Figure 6:
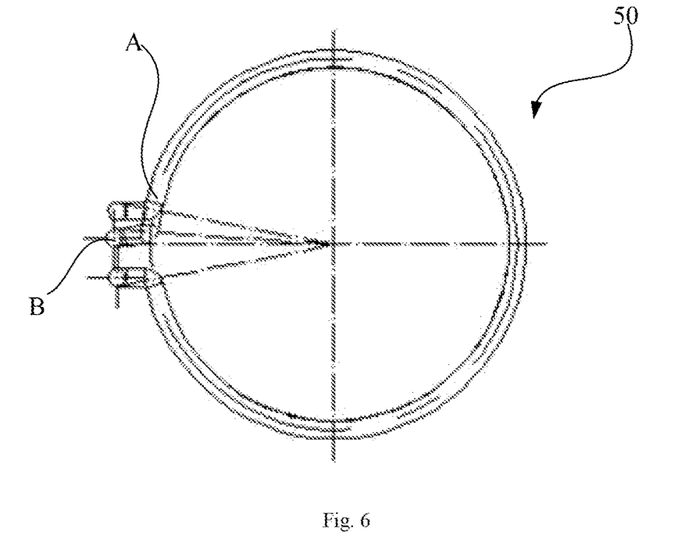
FIG. 6 is a schematic view of a holder in an initial state and a deformation state according to embodiments of the present disclosure.
Figure 7:
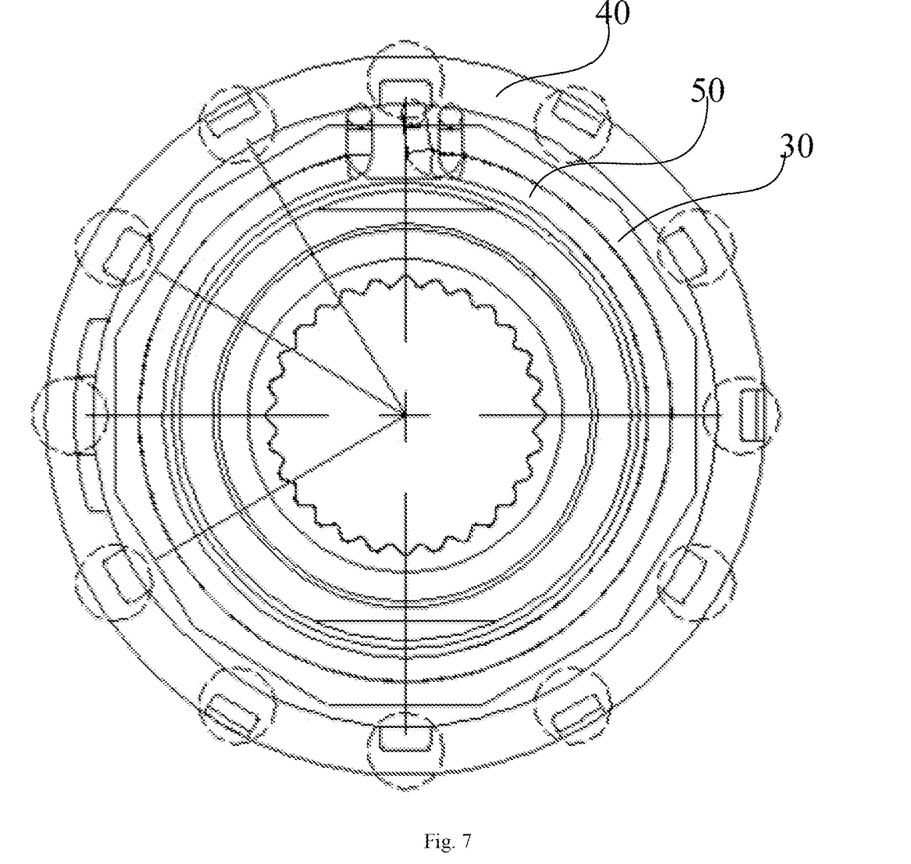
FIG. 7 is a schematic view of a half shaft, a transmission assembly and a holder fitted with each other according to embodiments of the present disclosure.

FIG. 6 is a schematic view of a holder in an initial state and a deformation state according to the embodiment of the present disclosure. FIG. 7 is a schematic view of the half shaft, the transmission assembly and the holder fitted with each other according to the embodiment of the present disclosure. As shown in FIG. 1 and FIGS. 6 to 7, in some embodiments, the clutch may further include a holder 50, which is arranged between the transmission assembly 40 and the half shaft 30, and configured to provide a preset resistance for hindering the relative rotation between the transmission assembly 40 and the half shaft 30. In this embodiment, the preset resistance provided by the holder 50 may be a friction resistance or an elastic resistance. Through the preset resistance applied by the holder 50, when the clutch is in the unengaged state, that is, when the electromagnet 10 is not powered on, the half shaft 30 and the transmission assembly 40 can be maintained to be relatively stationary through the resistance of the holder 50, so that the half shaft 30 and the transmission assembly 40 rotate together before the clutch is not engaged, and the transmission assembly 40 is maintained at the first gap X1. If the transmission assembly 40 needs to rotate relative to the half shaft 30, the preset resistance of the holder 50 needs to be overcome, so as to prevent the clutch from being engaged at will, thus improving the operation reliability.

In some embodiments of the present disclosure, as shown in FIGS. 6 to 8, the holder 50 includes a torsion spring sleeved on the outer side wall of the half shaft 30, two ends of the torsion spring both have a torsion arm 51, and the two torsion arms 51 both extend in a first direction. There is a preset included angle between the first direction and a radial direction of the torsion spring. The half shaft 30 has a first abutting groove 301, the transmission assembly 40 has a second abutting groove 42, the first abutting groove 301 is communicated with the second abutting groove 42, and the torsion arms 51 formed on the two ends of the torsion spring abut against side walls of the first abutting groove 301 and the second abutting groove 42, respectively. Thus, when the electromagnet 10 is powered on, the transmission assembly 40 overcomes the elastic resistance provided by the torsion spring, and rotates to the second gap X2 relative to the half shaft 30, the torsion spring expands to a state A in FIG. 6, and the clutch is in the engaged state. When the electromagnet 10 is powered off, the torsion spring can retract to a state B in FIG. 6 under the action of an elastic restoring force. During the retraction of the torsion spring, the transmission assembly 40 is driven to rotate to the first gap X1 relative to the half shaft 30, so that the clutch is in the unengaged state.

It should be noted that in this embodiment, the first direction can be parallel to the axial direction. At this time, the included angle between the first direction and the radial direction of the torsion spring is 90°. In some other embodiments, the included angle between the first direction and the radial direction of the torsion spring can be 30°, 45°, 60°, etc. It can be understood that the greater the included angle between the first direction and the radial direction of the torsion spring, the better the fixing stability of the torsion arm and the less easy the falling off of the torsion arm.

Further, the outer side wall of the half shaft 30 has an annular groove 31 for receiving the torsion spring, and the annular groove 31 is communicated with the first abutting groove 301. Since the annular groove 31 is arranged in the outer side wall of the half shaft 30 to receive the torsion spring, a position of the torsion spring is fixed and the operation thereof is reliable.

In addition, the base member 40a may include a main body 41a and an axial cover plate 42a arranged on an end of the main body 41a. The main body 41a is sleeved between the transmission disc 20 and the half shaft 30, and the second abutting groove 42 is arranged in the axial cover plate 42a. In the axial direction, the torsion spring is located between the main body 41a and the axial cover plate 42a. The torsion spring can be further axially limited by the axial cover plate 42a.

The axial cover plate 42a can be circumferentially fixed with the main body 41a, for example, detachably engaged, and the axial cover plate 42a can move axially relative to the main body 41a. A connection relationship between the axial cover plate 42a and the main body 41a can be similar to a connection relationship between the transmission disc 20 and the first magnetic suction member 21, which will not be repeated in this embodiment.

In some other embodiments, the axial cover plate 42a is detachably connected to the main body 41a by a fastener (e.g., a screw).

Further, the clutch may further include an axial stopper 60, which is sleeved on the half shaft 30 and located on a side of the axial cover plate 42a away from the main body 41a. The axial stopper 60 can limit the axial cover plate 42a axially. In particular, when the axial cover plate 42a and the main body 41a adopt the connection relationship similar to that between the transmission disc 20 and the first magnetic suction member 21, the axial stopper 60 can further limit the axial cover plate 42a.

It can be understood that in some other embodiments, the holder 50 can also be a rubber member, an axial telescopic spring, etc., as long as the resistance for hindering the relative rotation between the half shaft 30 and the transmission assembly 40 can be provided.

It should be noted that since the electromagnet 10 is fixed to the vehicle 100, due to a soft adsorption of the electromagnet 10, the rigid collision is avoided. The electromagnet 10 is fixed, and other components can rotate relative to the electromagnet 10, so as to ensure the normal transmission of the vehicle.

An embodiment of the present disclosure also provides a vehicle 100. The vehicle 100 in this embodiment can include any one of a hybrid electric vehicle, an automobile, a go-kart, a drift vehicle, an all-terrain vehicle, etc.

Specifically, the vehicle 100 of this embodiment includes the axle provided in the above embodiment. A front axle and a rear axle of the vehicle 100 have respective clutches. An electromagnet 10 in this embodiment can be fixed to a housing 70 of the axle. The respective clutches can be controlled separately to realize that the power system is engaged with the front axle and the rear axle or not. When the power system is engaged with the half shaft of the front axle through the clutch, the power of the power system can be transmitted to front wheels, and at this time, the front wheels are driving wheels; when the power system is engaged with the half shaft of the rear axle through the clutch, the power of the power system can be transmitted to rear wheels, and at this time, the rear wheels are driving wheels; or, when the power system is engaged with both the half shaft of the front axle and the half shaft of the rear axle through the clutches, the power of the power system is transmitted to the front wheels and the rear wheels respectively, and at this time, both the front wheels and the rear wheels are driving wheels.

In some embodiments, it is possible that only the front axle or the rear axle has the clutch, and the vehicle 100 can drive in the 2WD mode by default. For example, as long as the vehicle 100 is started, the front wheels of the vehicle 100 are the driving wheels, and whether the rear wheels participate in the drive is realized by whether the clutch between the rear axle and the power system is engaged or not.

The vehicle 100 provided by the embodiment of the present disclosure can be started and stopped in a forward rotation, a reverse rotation, a dynamic state and a stationary state of the wheels, without limitation, and has a good transition when engaged and disengaged.

A structure and a function of the axle used by the vehicle 100 in this embodiment are the same with those in the above embodiment. For details, reference may be made to the description of the above embodiment, which will not be repeated in this embodiment.

In addition, without confliction, various embodiments or examples or features of the various embodiments or examples described in the present specification may be combined by those skilled in the art.

It should be finally noted that, the above embodiments are only for purpose of explaining the technical solution of the present disclosure, but not for limitation; although the present disclosure is described in detail with reference to the afore-described embodiments, a person having ordinary skills in the art could understand that the technical solutions recited in the afore-described embodiments can still be modified, or an equivalent replacement to part of the technical features thereof can be performed; and these modifications and these replacements do not cause the essence of the corresponding technical solution to depart from the spirit and scope of the technical solution of the embodiments of the present disclosure.

What is claimed is:

1. An axle for a vehicle, comprising:
   a housing;
   an electromagnet fixed in the housing;
   a transmission disc rotatably arranged in the housing and connected to a transmission system of the vehicle, wherein the transmission disc is provided with a first magnetic suction member, and the first magnetic suction member is circumferentially fixed and axially movable relative to the transmission disc;
   a half shaft connected to wheels of the vehicle, wherein the transmission disc is sleeved on the half shaft, a first gap and a second gap are defined between the transmission disc and the half shaft in a radial direction, the first gap and the second gap are arranged in a circumferential direction, and the first gap is greater than the second gap in the radial direction; and
   a transmission assembly at least partially arranged between the transmission disc and the half shaft, wherein the transmission assembly comprises a base member, a protrusion member and a second magnetic suction member, the base member is sleeved between the transmission disc and the half shaft, the protrusion member is arranged on the base member and protrudes along a thickness direction of the base member, and the second magnetic suction member is circumferentially fixed and axially movable relative to the base member;
   a thickness of the protrusion member is less than the first gap, and greater than or equal to the second gap in the radial direction,
   wherein when the electromagnet is powered off, the transmission assembly and the half shaft are relatively stationary, and the transmission assembly is located at the first gap; when the electromagnet is powered on, the first magnetic suction member and the second magnetic suction member are attracted by the electromagnet to allow the transmission disc to rotate synchronously with the transmission assembly, and the transmission assembly rotates to the second gap relative to the half shaft and engages the half shaft with the transmission disc, wherein the protrusion member is clamped between the half shaft and the transmission disc when the transmission assembly is at the second gap.

2. The axle according to claim 1, wherein one of the first magnetic suction member and the transmission disc has a first engagement member extending in a direction parallel to an axial direction, the other one of the first magnetic suction member and the transmission disc has a first fitting portion fitted with the first engagement member, and the first engagement member is engaged into the first fitting portion to circumferentially fix the first magnetic suction member with the transmission disc.

3. The axle according to claim 1, wherein one of the second magnetic suction member and the transmission assembly has a second engagement member extending in a direction parallel to an axial direction, the other one of the second magnetic suction member and the transmission assembly has a second fitting portion fitted with the second engagement member, and the second engagement member is engaged into the second fitting portion to circumferentially fix the second magnetic suction member with the transmission assembly.

4. The axle according to claim 1, wherein one of the first magnetic suction member and the transmission disc has a first engagement member extending in a direction parallel to an axial direction, the other one of the first magnetic suction member and the transmission disc has a first fitting portion fitted with the first engagement member, and the first engagement member is engaged into the first fitting portion to circumferentially fix the first magnetic suction member with the transmission disc,
   wherein one of the second magnetic suction member and the transmission assembly has a second engagement member extending in a direction parallel to an axial direction, the other one of the second magnetic suction member and the transmission assembly has a second fitting portion fitted with the second engagement member, and the second engagement member is engaged into the second fitting portion to circumferentially fix the second magnetic suction member with the transmission assembly.

5. The axle according to claim 1, wherein at least two second gaps are provided, and in the circumferential direction, the at least two second gaps are located on both sides of the first gap, respectively.

6. The axle according to claim 5, wherein the transmission disc has a hollow interior and an inner peripheral surface of the transmission disc is a first contact surface;
   the half shaft comprises a connector, the connector is arranged inside the transmission disc, an outer peripheral surface of the connector is a second contact surface, one of the first contact surface and the second contact surface is an annular surface, and the other one of the first contact surface and the second contact surface is a regular polygon surface formed by a plurality of sections connected sequentially;

the first gap is formed between a middle portion of each section of the regular polygon surface and the annular surface, and the second gap is formed between a portion on either side of the middle portion of each section of the regular polygon surface and the annular surface.

7. The axle according to claim 1, wherein the protrusion member is rotatably connected to the base member, and a rolling direction of the protrusion member is consistent with a rotation direction of the base member.

8. The axle according to claim 1, wherein the protrusion member comprises at least one of a ball and a roller;
a plurality of protrusion members are provided, and each protrusion member is correspondingly fitted with each section of the regular polygon surface.

9. The axle according to claim 1, further comprising a holder, wherein the holder is arranged between the transmission assembly and the half shaft, and is configured to provide a preset resistance for hindering the relative rotation between the transmission assembly and the half shaft.

10. The axle according to claim 9, wherein the holder comprises a torsion spring, the torsion spring is sleeved on an outer side wall of the half shaft, two ends of the torsion spring both have a torsion arm, and the two torsion arms both extend in a first direction, wherein a preset included angle is defined between the first direction and a radial direction of the torsion spring;
the half shaft has a first abutting groove, the transmission assembly has a second abutting groove, the first abutting groove is communicated with the second abutting groove, and the torsion arms on the two ends of the torsion spring abut against side walls of the first abutting groove and the second abutting groove, respectively.

11. The axle according to claim 10, wherein the outer side wall of the half shaft has an annular groove for receiving the torsion spring, and the annular groove is communicated with the first abutting groove.

12. The axle according to claim 10, wherein the base member comprises a main body and an axial cover plate arranged on an end of the main body, the main body is sleeved between the transmission disc and the half shaft, and the second abutting groove is arranged in the axial cover plate.

13. The axle according to claim 12, wherein the axial cover plate is fixed circumferentially.

14. The axle according to claim 12, wherein the axial cover plate is detachably connected to the main body.

15. A vehicle, comprising an axle, wherein the axle comprises:
a housing;
an electromagnet fixed in the housing of the axle;
a transmission disc rotatably arranged in the housing of the axle and connected to a transmission system of the vehicle, wherein the transmission disc is provided with a first magnetic suction member, and the first magnetic suction member is circumferentially fixed and axially movable relative to the transmission disc;
a half shaft connected to wheels of the vehicle, wherein the transmission disc is sleeved on the half shaft, a first gap and a second gap are defined between the transmission disc and the half shaft in a radial direction, the first gap and the second gap are arranged in a circumferential direction, and the first gap is greater than the second gap in the radial direction; and
a transmission assembly at least partially arranged between the transmission disc and the half shaft, wherein the transmission assembly comprises a base member, a protrusion member and a second magnetic suction member, the base member is sleeved between the transmission disc and the half shaft, the protrusion member is arranged on the base member and protrudes along a thickness direction of the base member, and the second magnetic suction member is circumferentially fixed and axially movable relative to the base member;
a thickness of the protrusion member is less than the first gap, and greater than or equal to the second gap in the radial direction,
wherein when the electromagnet is powered off, the transmission assembly and the half shaft are relatively stationary, and the transmission assembly is located at the first gap; when the electromagnet is powered on, the first magnetic suction member and the second magnetic suction member are attracted by the electromagnet to allow the transmission disc to rotate synchronously with the transmission assembly, and the transmission assembly rotates to the second gap relative to the half shaft and engages the half shaft with the transmission disc, wherein the protrusion member is clamped between the half shaft and the transmission disc when the transmission assembly is at the second gap.

16. The vehicle according to claim 15, wherein at least two second gaps are provided, and in the circumferential direction, the at least two second gaps are located on both sides of the first gap, respectively.

17. The vehicle according to claim 16, wherein the transmission disc has a hollow interior and an inner peripheral surface of the transmission disc is a first contact surface;
the half shaft comprises a connector, the connector is arranged inside the transmission disc, an outer peripheral surface of the connector is a second contact surface, one of the first contact surface and the second contact surface is an annular surface, and the other one of the first contact surface and the second contact surface is a regular polygon surface formed by a plurality of sections connected sequentially;
the first gap is formed between a middle portion of each section of the regular polygon surface and the annular surface, and the second gap is formed between a portion on either side of the middle portion of each section of the regular polygon surface and the annular surface.

18. The vehicle according to claim 15, wherein the protrusion member is rotatably connected to the base member, and a rolling direction of the protrusion member is consistent with a rotation direction of the base member.

* * * * *